US006433534B1

United States Patent
Spellman

(10) Patent No.: US 6,433,534 B1
(45) Date of Patent: Aug. 13, 2002

(54) INCREASED OUTPUT VARIABLE RELUCTANCE SENSOR

(75) Inventor: Charles Albert Spellman, Auburn, IN (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/742,517

(22) Filed: Dec. 20, 2000

(51) Int. Cl.[7] .............................. G01B 7/14; G01B 7/30
(52) U.S. Cl. ................... 324/207.15; 324/232
(58) Field of Search ................ 324/207.15, 207.12, 324/207.22, 207.25, 173, 174, 161, 162, 166, 232, 239

(56) References Cited

U.S. PATENT DOCUMENTS

| 3,492,518 A | | 1/1970 | Wayne |
|---|---|---|---|
| 4,268,771 A | | 5/1981 | Lace |
| 5,422,432 A | | 6/1995 | Lace |
| 5,602,472 A | * | 2/1997 | Bergstedt et al. ...... 324/207.25 |
| 5,942,891 A | * | 8/1999 | Miyazaki et al. .......... 324/173 |

* cited by examiner

Primary Examiner—Edward Lefkowitz
Assistant Examiner—Subhash Zaveri

(57) ABSTRACT

A variable reluctance sensor is shown for determining the speed or position of a moveable target object. The sensor has a magnet which is coupled to a pole piece. A wire coil is located annularly around the pole piece. The magnet generates flux in the coil which is changed by the movement of the target object. A second bucking magnet is annularly located around the coil and generates a flux field to reinforce the flux in the coil and to prevent flux from leaking from the wire coil and pole piece. In this manner, the voltage output from the coil is increased due to the decrease in flux leakage. A processor unit is coupled to the wire coil. The processor unit measures the reluctance generated in the coil from the movement of the target object.

12 Claims, 4 Drawing Sheets

INCREASED OUTPUT VARIABLE RELUCTANCE SENSOR

FIELD OF INVENTION

This invention relates to a variable reluctance sensor. More specifically, this invention relates to a reluctance sensor which enhances low output signals by reducing magnetic flux leakage.

BACKGROUND

It is desirable in many applications to determine the precise position or speed of various objects which linearly traverse a defined path or a rotational path. For example, the position or speed of numerous items in the automotive field such as transmission input and output shafts, crankshaft or tone wheels for anti-lock braking systems. A common type of sensor used in automotive components is a variable reluctance sensor which functions by sensing the change in reluctance from a ferrous target as the air gap between the sensor and the target changes. This is usually accomplished by cutting slots in the target and passing it by the sensor.

A variable reluctance sensor is used because it is rugged and is of relatively low cost. The variable reluctance sensor typically has a pole piece with a coil of wire. A magnet is located in the sensor and generates a magnetic field in the coil. The target object is a ferrous material such as steel or iron whose movement effects the flux within the coil generated by the magnet. For example, a target object may be a gear whose teeth are in proximity to the variable reluctance sensor. The reluctance is measured from the pole piece or magnet and is proportional to the distance from the target object. The magnet may either be in the front of the pole or the rear of the pole piece. Another configuration is having a stacked magnetic material forming a rectangular pole piece having alternating ferrous and magnetic material. The reluctance change on one end of the stack also changes the flux paths in the other end which creates the voltage change in the coil.

The output of the variable reluctance sensor depends on the rate of change of magnetic flux in the coil. The voltage generated by the coil is proportional to the number of turns in the coil. Given the air gap between the pole piece and the target object as well as magnetic paths through the pole piece and other sensor assembly, some of the magnetic flux leaks and does not affect the coil. Generally, it is desirable to have a higher voltage output for easier reading of the sensor output. Thus, the more leakage of magnetic field flux, the lower the voltage output. At low speeds of the target object, lower rate of change of flux is generated in the coil, which combined with inherent leaks, results in a lower voltage output from the sensor.

The present reluctance sensors may be enhanced in order to increase low voltage output. For example, added ferrous paths may be created by providing additional pole pieces near the target object. The additional pole pieces allow the capture of additional flux thus increasing overall voltage output. However, these modifications add cost and complexity to the system, nullifying the advantages of the variable reluctance sensor. Such corrections also require extra processing for the additional pole pieces which increase the complexity and cost of the device.

Thus, there exists a need for an increased output reluctance sensor. There is also a need for a reluctance sensor which does not require excessive processing components. There is a further need for a reluctance sensor which provides high output from target objects with low flux levels.

SUMMARY OF THE INVENTION

The present invention may be embodied in a variable reluctance sensor for determining the position of a moveable target object. The sensor has a magnet and a pole piece coupled to the magnet. A wire coil is located annularly around the pole piece. A second bucking magnet is annularly located around the coil which generates a flux field. A control unit is coupled to the wire coil which measures the sinusoidal signal generated in the coil from the movement of the target object.

The present invention may also be embodied in a method of increasing the voltage output from a variable reluctance sensor. The sensor has a pole piece, a coil located annularly around the pole piece, and a magnet. A bucking magnet is added around the coil to produce flux to cancel leaking flux from the sensor to increase coil voltage output.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
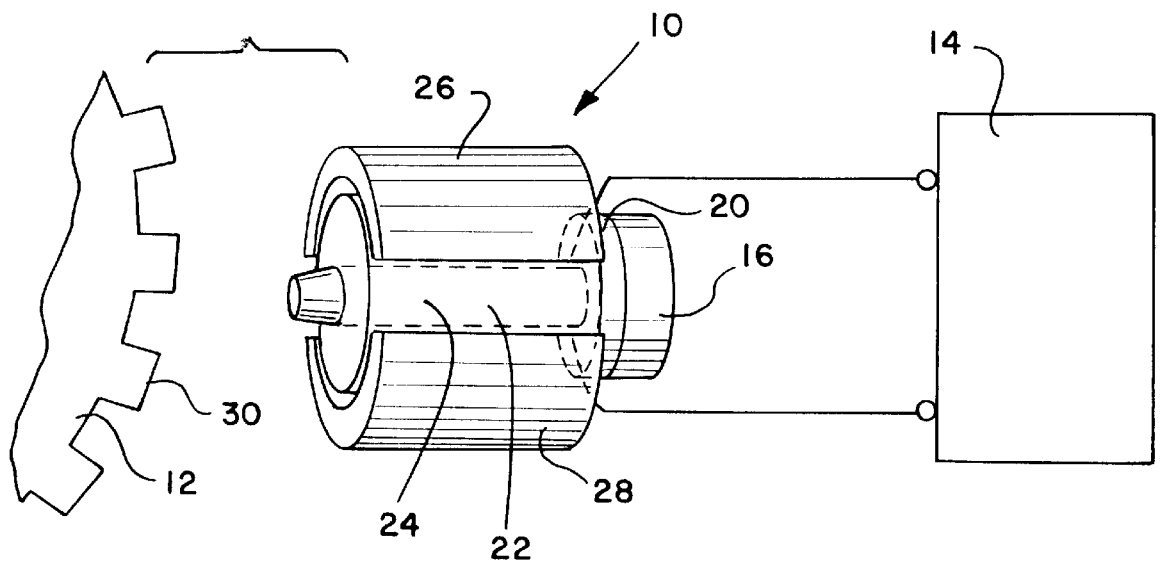
FIG. 1 is a perspective view of a variable reluctance sensor according to one embodiment of the present invention.
Figure 2:
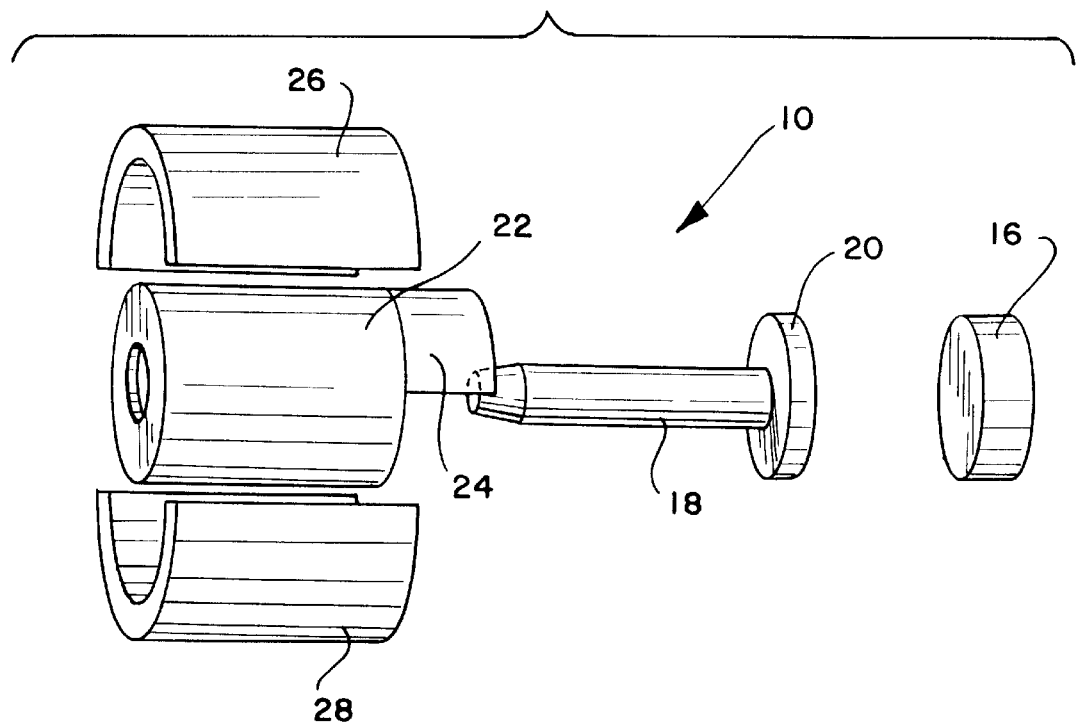
FIG. 2 is an exploded perspective view of the variable reluctance sensor of FIG. 1

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Referring now to the drawings and more particularly to FIGS. 1–4 which show a perspective, exploded perspective and cross sectional views of a variable reluctance sensor generally indicated at 10, embodying the general principles of the present invention.

In general, the variable reluctance sensor 10 senses the rotation of a target object 12. The target object must be made of a ferrous material such as steel and may move in a linear or angular motion relative to the variable reluctance sensor 10. The target object 12 in this example is a gear and the sensor 10 detects the rotation of the gear. Of course, it is to be understood that any rotational or linear movement device may be used with the sensor 10. The target object 12 which is sensed by the sensor 10 is typically rotated around an axis (not shown) to insure strict angular movement.

The outputs of the sensor 10 are coupled to a control system 14. The sensor 10 has a disk shaped magnet 16 which is coupled to a pole piece 18. The pole piece has a proximal end which is close to the target object 12 and a distal end. There is an air gap between the proximal end of the pole piece 18 and the target object 12. The pole piece 18 has a platter 20 which is located on the distal end of the pole piece 18 and supports the magnet 16. The pole piece 18 is a ferrous material and has a wire coil 22 which is coupled to the control system 14. It is to be understood that the magnet 16 may be located in any appropriate location to generate a magnetic field within the coil 22. For example, the magnet 16 may be located on a platter on the proximal end of the pole piece 18.

A circular covering 24 is located over the coil 22 to protect the coil 22. The circular covering 24 is typically an insulator material such as plastic. Two pairs of bucking magnets 26 and 28 are coupled around the coil 22. Alternatively, a single ring magnet with one pole on the inside of the ring and another pole on the outside could be used for the magnets 26 and 28. The target object 12 moves rotationally and has a series of gear teeth 30. Since the target object 12 is metal, its movement changes the flux in the wire coil 22.

Figure 3:
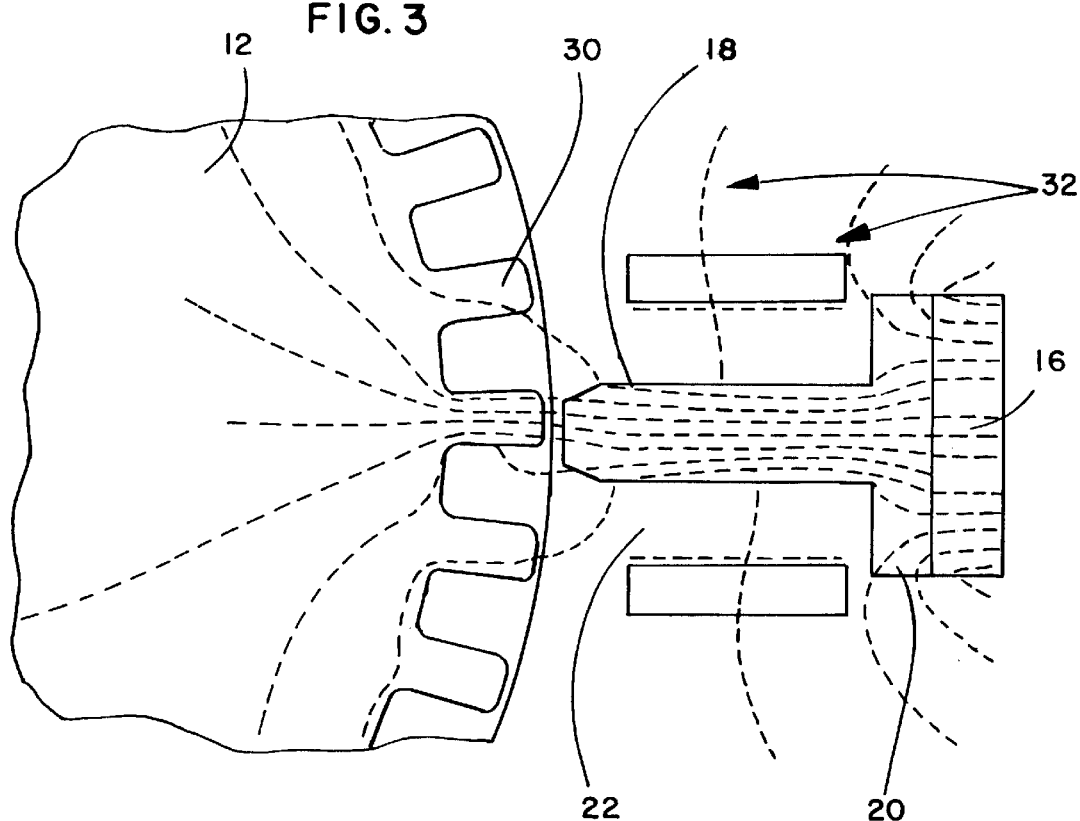
FIG. 3 is cross sectional flux diagram of the magnetic fields surrounding the variable reluctance sensor in FIG. 1 without the addition of bucking magnets.

The flux generated by the magnet 16 and shaped by the target object 12 is shown in FIG. 3 which is a cross section of the sensor 10. The flux generates a voltage output from the coil 22 which is coupled to the control system 14. FIG. 3 models the magnetic flux lines without the bucking magnets 26 and 28. In this case a series of flux lines 32 are leaking from the pole piece 18 and the coil 22. The leaking flux reduces the electrical output measurable from the coil 22. The leaking flux thus significantly affects the output at low speeds of the target object 12 because the generated flux change is proportional to the speed of the target object 12 and thus is low to begin with.

Figure 4:
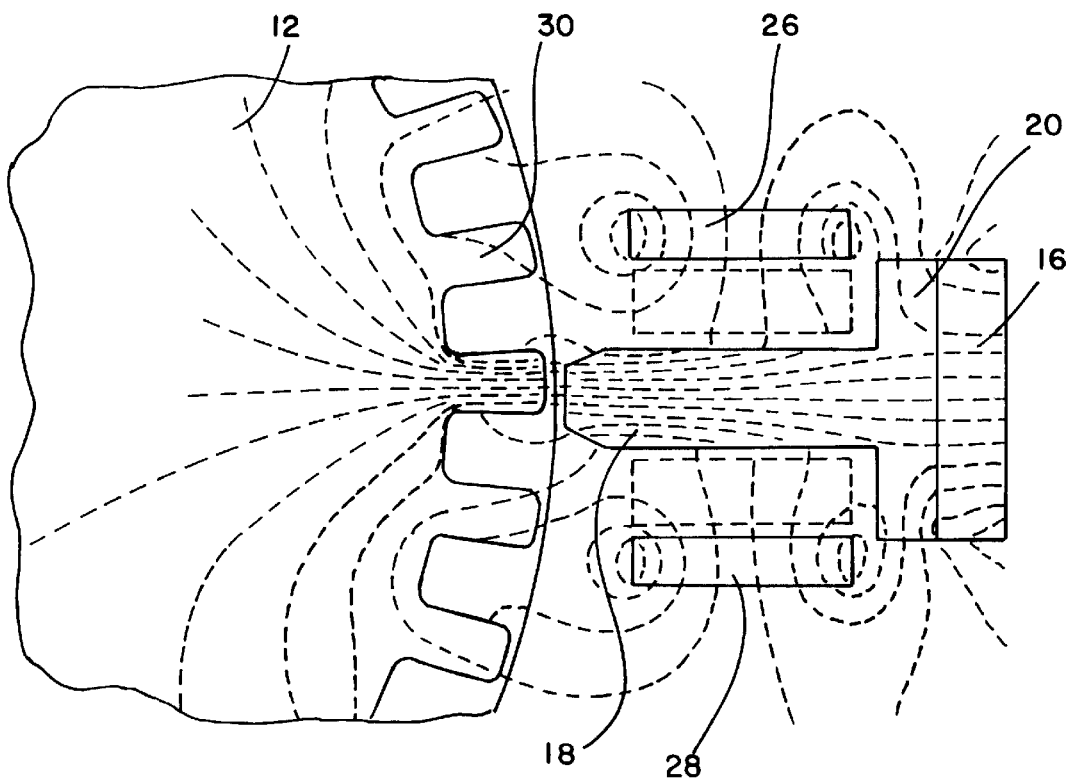
FIG. 4 is cross sectional flux diagram of the magnetic fields surrounding the variable reluctance sensor in FIG. 1 with the addition of bucking magnets.

The operation of the sensor 10 will now be explained with reference to FIG. 4 which is a flux diagram of the sensor 10 in FIG. 1 with the bucking magnets 26 and 28. The movement of the target object 12 shapes a magnetic field in the coil 22 with a series of flux lines. The bucking magnets 26 and 28 force the flux from the magnetic field to travel through the pole piece 18 and the coil 22. The bucking magnets 26 and 28 thus prevent leaking of the flux from the pole piece 18 and therefore increase the flux change and ultimate voltage from the coil 22.

Figure 5:
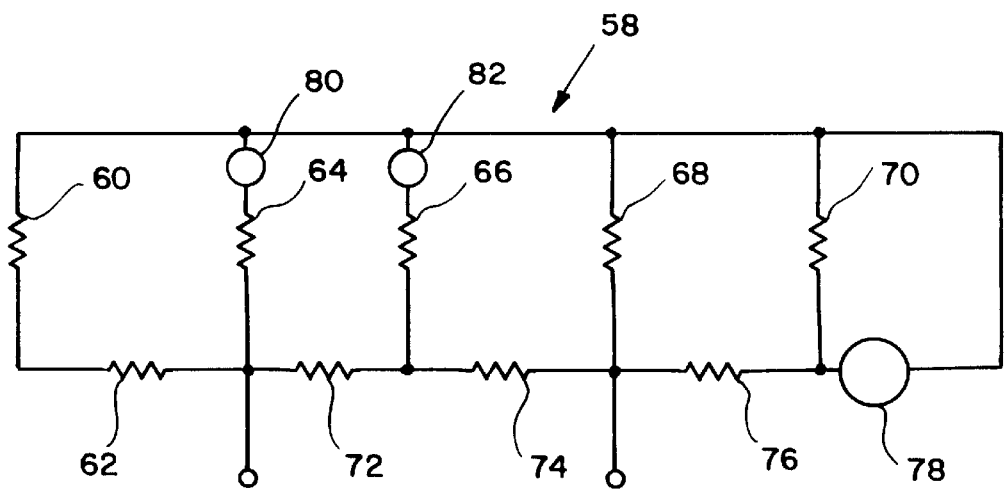
FIG. 5 is a circuit diagram model of the variable reluctance sensor according to one embodiment of the present invention.

FIG. 5 shows an electrical circuit representation 58 of the interaction between the coil 22 and the target object 12 in FIGS. 1–4. The target object 12 is represented by a target resistor 60. The gap between the target object 12 and the sensor 10 is modeled by an air gap resistor 62. The flux leaking from the end of the pole 18 opposite the platter is represented by a resistor 64 while the flux leaking from the pole 18 to the coil 22 is represented by a resistor 66. Two resistors 68 and 70 are in parallel and represent the flux leaks from the platter 20 and the magnet 16.

The pole piece 18 is represented by two resistors 72 and 74 which create a voltage drop representing the flux generated in the coil 22 ultimately detected by the control circuit 14. The platter 20 is represented by a resistor 76. The magnet 16 is represented by a voltage source 78. The current in the circuit diagram 58 represents the flux. Thus, it is beneficial to maximize the voltage measured across the output represented by the resistors 72 and 74. The bucking magnets 26 and 28 create flux which replaces the leakage flux and enhances the flux generated in the coil. The bucking magnets 26 and 28 are modeled as voltage sources 80 and 82 which are in series with the resistors 72 and 74. Using the electrical model, additional voltage sources result in greater outputs. The increase in current as a result of the voltage sources 80 and 82 on the resistors 64 and 66 results in greater voltage/flux across the resistors 72 and 74. The elimination of the leakage flux and the addition of the flux from the two bucking magnets 26 and 28 thus increases the reluctance output. The bucking magnets 26 and 28 may be increased in length to optimize the cancellation of flux leakage. Additionally, the length of the bucking magnets 26 and 28 may be altered to produce the largest voltage output for a selected target and air gap configuration.

Figure 6:
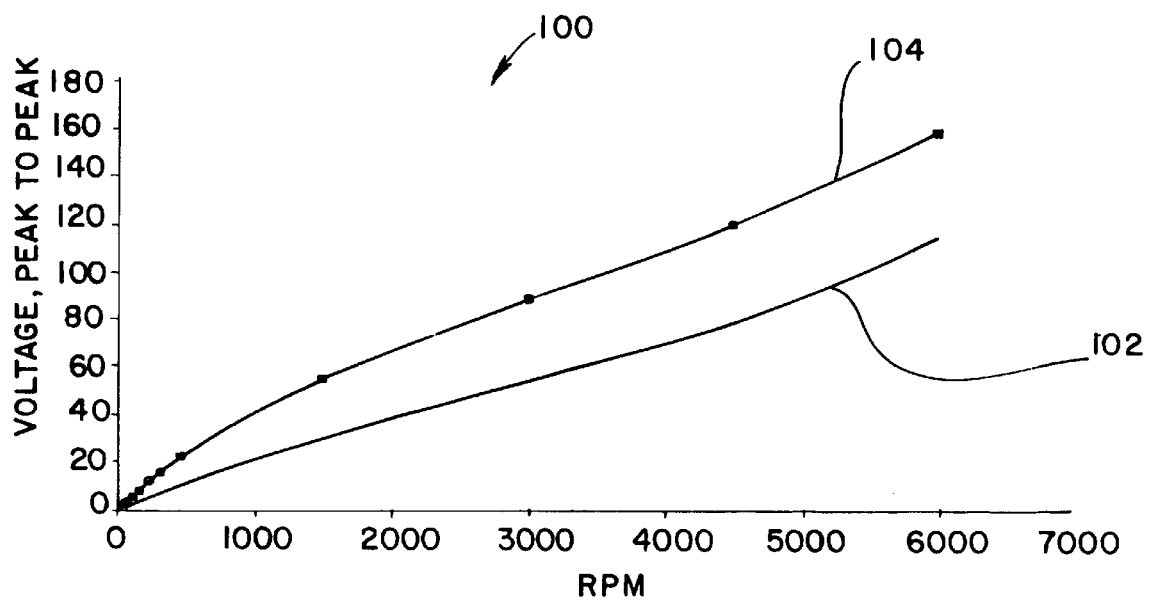
FIG. 6 is a graph of the output of the variable reluctance sensor with the placement of the bucking magnets according to the present invention in comparison with a standard variable reluctance sensor.

The output of the sensor 10 may be shown in FIG. 6 which is a voltage graph 100 representing the voltage outputs from the coil 22 in FIG. 1. A bottom trace 102 represents the voltage output of the sensor 10 without the bucking magnets 26 and 28. A top trace 104 represents the voltage output of the coil 22 with bucking magnets 26 and 28. As may be seen, the flux leakage is reduced and the corresponding voltage is higher resulting in a more usable sensor.

Figure 7:
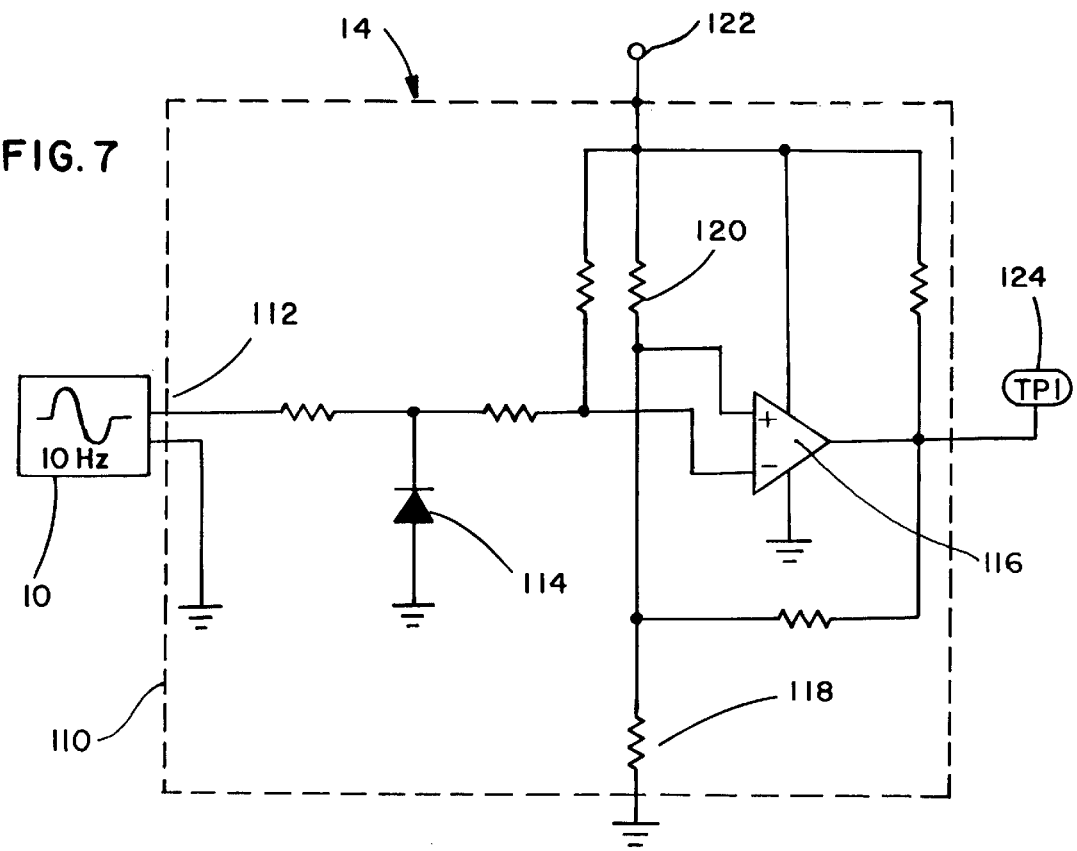
FIG. 7 is a circuit schematic of a control circuit used by the variable reluctance sensor according to one embodiment of the present invention.

FIG. 7 is a schematic of the control circuit 14 which receives an output from the coil 22 of the sensor 10. The motion of the target object 12 generates a sinusoidal signal from the coil 22 as the magnetic flux changes due to the velocity of the target object 12. The outputs of the sensor 10 are coupled to a zero detection circuit 110 which detects the time when the sinusoidal signal crosses zero in order to determine the frequency of the signal which is proportional to the speed of the target. It is to be understood that any other appropriate circuit may be used to detect changes in the flux. For example, a peak detection circuit may be used instead of the zero crossing detection circuit 110.

The zero crossing detection circuit 110 has an input 112 which is coupled to the output of the sensor 10. A diode 114 clips the negative part of the voltage signal. The input 112 is coupled to the negative input of an operational amplifier 116. The positive input of the operational amplifier 116 is coupled to a reference resistor 118. Another resistor 120 is coupled to a voltage source 122. The resistor 120 and resistor 118 provide a reference level voltage to compare the negative input of the operational resistor 118. The output of the operational amplifier 116 therefore goes high when the negative input is higher than the reference voltage indicating a zero crossing point.

The output of the operational amplifier 116 is coupled to a micro-controller 124. The micro-controller 124 may be any specific, dedicated controller or a programmable microprocessor, application specific integrated circuit (ASIC) or any other comparable circuit. The micro-controller 124 processes the output of the operational amplifier 116 by reading the number of high pulses in a certain time period indicating the frequency of the teeth 30 detected by the sensor 10 and therefore the position or speed of the target object 12. The micro-controller 124 uses this data to control devices. In this example, the micro-controller 124 is coupled to a transmission shift assembly 126. The micro-controller 124 will activate the transmission shift assembly when the target object 12 which determines the transmission shaft speed reaches a certain speed.

Figure 8:
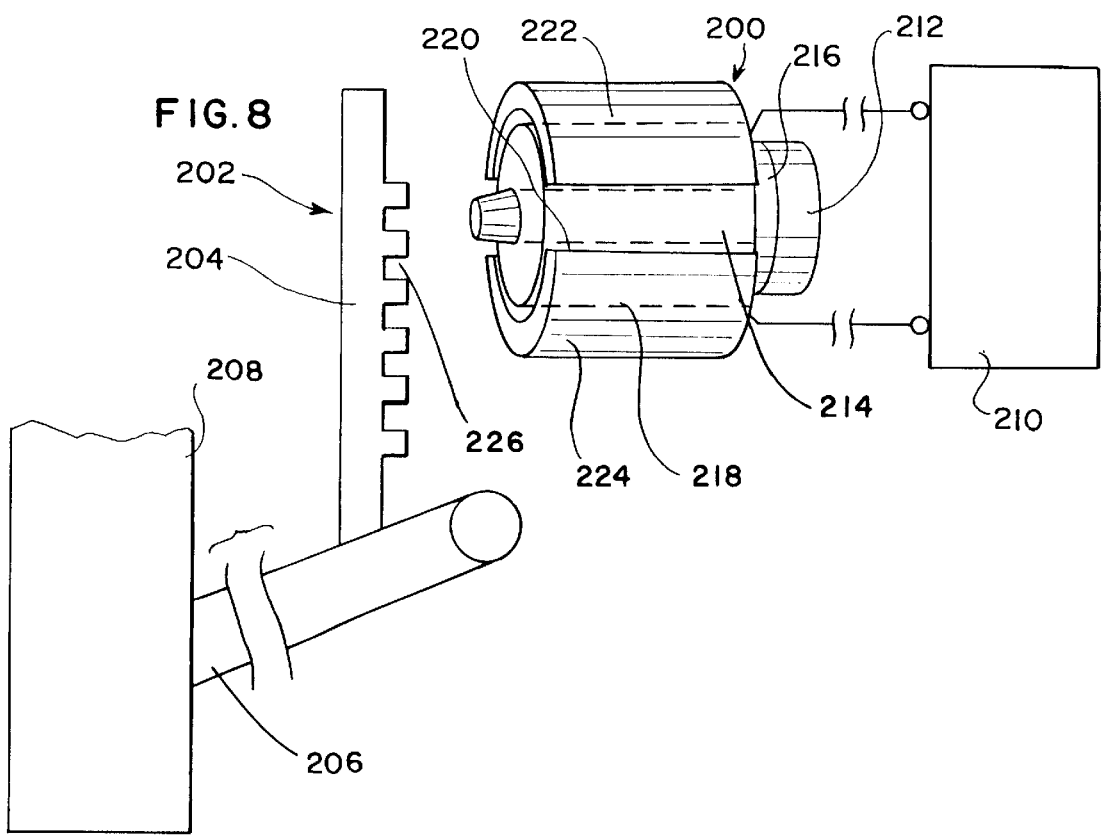
FIG. 8 is a cross sectional flux diagram of a second variable reluctance sensor.

FIG. 8 is a perspective view of a variable reluctance sensor 200 according to the present invention which senses the absolute position of a linearly moving target object 202. In this case the target object is a rod 204 which is attached to the traveling portion of a suspension system 206. The suspension system 206 holds a wheel 208. By determining the position of the rod 204, the position of the wheel 208 may be determined for adjustments by the suspension system.

The outputs of the sensor 200 are coupled to a control system 210 which is identical to the control system 14 described with reference to FIG. 7 above. The sensor 200 is similar to the sensor 10 described with reference to FIGS. 1–3 above. The sensor 200 has a disk shaped magnet 212 which is coupled to a pole piece 214. The pole piece has a proximal end which is close to the target object 202 and a distal end. There is an air gap between the proximal end of the pole piece 214 and the target object 202. The pole piece 214 has a platter 216 which is located on the distal end of the pole piece 214 and supports the magnet 212. The pole piece 214 is a ferrous material and has a wire coil 218 which is coupled to the control system 210. It is to be understood that the magnet 212 may be located in any appropriate location to generate a magnetic field within the coil 218.

A covering 220 is located over the coil 218 to protect the coil 218. The circular covering 218 is typically an insulator material such as plastic. Two pairs of magnets 222 and 224 are coupled around the coil 218.

The rod 204 is made of a ferrous material such as steel and has a series of teeth 226. Since the rod 204 is metal, its movement changes the flux in the wire coil 218 by the movement of the teeth 226 relative to the sensor 200. The flux generated by the movement of the rod 204 generates a voltage output from the coil 218 which is coupled to the control system 210. The magnets 222 and 224 force the flux from the magnetic field to travel through the pole piece 214 and the coil 218. The magnets 222 and 224 thus prevent leaking of the flux from the pole piece 214 and therefore increase the flux change and voltage output from the coil 218.

Of course, the present invention may be employed in any application which requires determination of linear position or rotational position. Examples in the automotive field include suspension travel, crankshaft or crankshaft rotation and positioning, wheel speed and transmission shaft speed.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A stationary variable reluctance sensor for determining the position of a moveable target object, the sensor comprising:

a magnet;

a pole piece coupled to the magnet;

a wire coil located annularly around the pole piece;

a second bucking, magnet annularly located around the coil which generates a flux field and wherein an air gap is created between the target object and the magnet, the pole piece, the wire coil and the second bucking magnet;

a control unit coupled to the wire coil which measures the sinusoidal signal generated in the coil from the movement of the target object.

2. The sensor of claim 1 wherein the control unit further includes:

a peak detection circuit coupled to the coil, the peak detection circuit detecting the peak output of the sinusoidal signal output from the coil from the movement of the target object;

a processor coupled to the peak detection circuit which determines the frequency of the flux change based on the output of the peak detection circuit.

3. The sensor of claim 1 wherein the control unit further includes:

a zero detection circuit coupled to the coil, the zero detection circuit detecting the points when the sinusoidal signal output from the coil from the movement of the target object crosses zero voltage;

a processor coupled to the zero detection circuit which measures the frequency of the sinusoidal signal.

4. The sensor of claim 3 wherein the processor provides an output control signal in response to a specific frequency.

5. The sensor of claim 1 wherein the target object moves in a linear path.

6. The sensor of claim 1 wherein the target object moves rotationally around an axis.

7. The sensor of claim 1 wherein the pole piece has a proximal end relative to the target object and a distal end and wherein the magnet is located on a platter on the distal end.

8. The sensor of claim 1 wherein the pole piece has a proximal end relative to the target object and a distal end and wherein the magnet is located on a platter on the proximal end.

9. A method of increasing the voltage output from a stationary variable reluctance sensor usable to sense to movement of a target, the sensor having a pole piece, a coil located annularly around the pole piece, and a magnet, separated by the target via an air gap the method comprising:

adding a bucking magnet around the coil to produce flux t o cancel leaking flux from the sensor to increase coil voltage output.

10. The method of claim 9 further comprising increasing the length of the bucking magnet to produce the largest voltage output for the selected target and air gap configuration.

11. The method of claim 9 wherein the selected target moves in a linear motion.

12. The method of claim 9 wherein the selected target moves in a rotational motion.

* * * * *